United States Patent
Reinecke (10) Patent No.: US 10,188,034 B2
(45) Date of Patent: Jan. 29, 2019

(54) MATERIAL GUIDE FOR A STRAW HOOD OF AN AGRICULTURAL VEHICLE

(71) Applicant: CNH Industrial America LLC, New Holland, PA (US)

(72) Inventor: Clay A. Reinecke, Blue Grass, IA (US)

(73) Assignee: CNH Industrial America LLC, New Holland, PA (US)

( * ) Notice: Subject to any disclaimer, the term of this patent is extended or adjusted under 35 U.S.C. 154(b) by 551 days.

(21) Appl. No.: 14/875,315

(22) Filed: Oct. 5, 2015

(65) Prior Publication Data
US 2017/0094902 A1 Apr. 6, 2017

(51) Int. Cl.
| | |
|---|---|
| A01D 41/12 | (2006.01) |
| A01F 7/06 | (2006.01) |
| A01F 12/18 | (2006.01) |
| A01F 12/44 | (2006.01) |

(52) U.S. Cl.
CPC .......... *A01D 41/1243* (2013.01); *A01F 7/067* (2013.01); *A01F 12/18* (2013.01); *A01F 12/444* (2013.01)

(58) Field of Classification Search
CPC ..... A01D 41/1243; A01F 7/067; A01F 12/18; A01F 12/444; A01F 12/40
See application file for complete search history.

(56) References Cited

U.S. PATENT DOCUMENTS

| | | | |
|---|---|---|---|
| 3,306,015 A | 2/1967 | Myers | |
| 3,669,123 A | 6/1972 | Gaeddert et al. | |
| 3,717,062 A * | 2/1973 | Gaeddert | A01F 12/40 241/292.1 |
| 4,056,107 A * | 11/1977 | Todd | A01D 41/1243 241/186.3 |
| 4,711,253 A * | 12/1987 | Anderson | A01D 41/1243 460/100 |
| 6,547,169 B1 * | 4/2003 | Matousek | A01D 41/1243 239/149 |
| 6,736,721 B2 | 5/2004 | Niermann et al. | |

(Continued)

FOREIGN PATENT DOCUMENTS

DE 195 35 424 A1 3/1997

OTHER PUBLICATIONS

European Search Report; 16192191.1-1655; dated Feb. 23, 2017.

*Primary Examiner* — Thomas B Will
*Assistant Examiner* — Joan D Misa
(74) *Attorney, Agent, or Firm* — Patrick M. Sheldrake; Peter K. Zacharias (57) ABSTRACT

An agricultural vehicle includes a chassis; a crop processing mechanism carried by the chassis and configured to separate crop material and discharge crop residue therefrom; and a residue handling system that receives separated crop material and discharged crop residue from the crop processing mechanism. The residue handling system includes at least one spreader device defining a spreader exit; a windrow exit; a straw door selectively positionable between a first position and a second position, the straw door directed toward the spreader exit in the first position and directed toward the windrow exit in the second position; and a flexible guide associated with the straw door and having a shape that deforms when the straw door switches between the first position and the second position.

20 Claims, 5 Drawing Sheets

(56) References Cited

U.S. PATENT DOCUMENTS

| | | | |
|---|---|---|---|
| 6,881,145 B2 * | 4/2005 | Holmen | A01D 41/1243 460/112 |
| 6,908,379 B2 * | 6/2005 | Gryspeerdt | A01D 41/1243 460/111 |
| 7,063,613 B2 * | 6/2006 | Weichholdt | A01F 12/40 460/112 |
| 7,066,810 B2 * | 6/2006 | Farley | A01D 41/1243 460/112 |
| 7,220,179 B2 * | 5/2007 | Redekop | A01D 41/1243 460/112 |
| 8,585,475 B2 | 11/2013 | Isaac et al. | |
| 8,992,294 B2 * | 3/2015 | Dilts | A01D 41/1243 460/111 |
| 9,107,349 B2 * | 8/2015 | Dilts | A01D 41/1243 |
| 9,137,944 B2 * | 9/2015 | Dilts | A01D 41/1243 |
| 9,554,518 B2 * | 1/2017 | Murray | A01F 12/00 |
| 2014/0066147 A1 | 3/2014 | Dilts et al. | |
| 2015/0011275 A1 | 1/2015 | Murray et al. | |

* cited by examiner

MATERIAL GUIDE FOR A STRAW HOOD OF AN AGRICULTURAL VEHICLE

BACKGROUND OF THE INVENTION

1. Field of the Invention

The present invention relates to agricultural vehicles, and, more particularly, to straw hoods in agricultural vehicles.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed, it falls through perforations in the concaves onto a grain pan. From the grain pan, the grain is cleaned using a cleaning system, and is then transported to a grain tank onboard the combine. A cleaning fan blows air through the sieves to discharge straw, chaff and other debris toward the rear of the combine.

During the process of harvesting, crop material other than grain (MOG) is intended to be expelled from the combine. This material is usually derived from one of two areas, the threshing rotor or the cleaning system. The material expelled from the threshing rotor is generally referred to as straw and the material expelled from the cleaning system is generally referred to as chaff. This crop residue can be dealt with in several ways, generally categorized as spread and windrowed.

Spread refers to using a mechanical device to distribute the straw and/or chaff evenly across the width of the combine header cut width. This spread material is usually chopped to as short a length as possible so that when it is spread it will break down as quickly as possible and not interfere with tillage or seeding operations.

Windrowing refers to the process of dropping straw directly behind the combine in a continuous stream. The purpose of doing this is usually to allow post harvest processing of the straw such as shaping it into bales. In this process, the straw is usually allowed to pass through the combine with as little interference as possible so that it remains as close as possible to its original length and condition.

Combines have been developed that have one spreader system capable of both spreading and windrowing crop material from the combine during operation, without the need to stop and reconfigure the spreader system. Such a combine is taught, for example, by U.S. Patent Application Publication No. 2015/0011275 to Murray et al. The combine taught by Murray et al. is conveniently changeable between a spreading mode and a windrowing mode. However, the rear straw door can create an abrupt blockage of the exit trajectory of the crop material when in the spreading mode. This abrupt change in trajectory can cause uneven feeding to the spreaders and blockages of the rear hood.

What is needed in the art is a harvester that is conveniently changeable between a spreading mode and a windrowing mode and can more evenly feed the spreaders with crop material.

SUMMARY OF THE INVENTION

The present invention provides a re-positionable straw door and a flexible guide associated with the straw door that deforms when the straw door switches between positions.

The invention in one form is directed to an agricultural vehicle including: a chassis; a crop processing mechanism carried by the chassis and configured to separate crop material and discharge crop residue therefrom; and a residue handling system that receives separated crop material and discharged crop residue from the crop processing mechanism. The residue handling system includes: at least one spreader device defining a spreader exit; a windrow exit; a straw door selectively positionable between a first position and a second position, the straw door directed toward the spreader exit in the first position and directed toward the windrow exit in the second position; and a flexible guide associated with the straw door and having a shape that deforms when the straw door switches between the first position and the second position.

The invention in another form is directed to a residue handling system for an agricultural harvester including: at least one spreader device defining a spreader exit; a windrow exit; a straw door selectively positionable between a first position and a second position, the straw door directed toward the spreader exit in the first position and directed toward the windrow exit in the second position; and a flexible guide associated with the straw door and having a shape that deforms when the straw door switches between the first position and the second position.

An advantage of the present invention is the flexible guide can create a smooth trajectory path for residue headed toward the spreader.

Another advantage is the chance for a rear hood blockage can be reduced by the smooth trajectory path.

Yet another advantage is the flexible guide is automatically deformed by the movement of the straw door and therefore requires no separate adjustment during operation.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
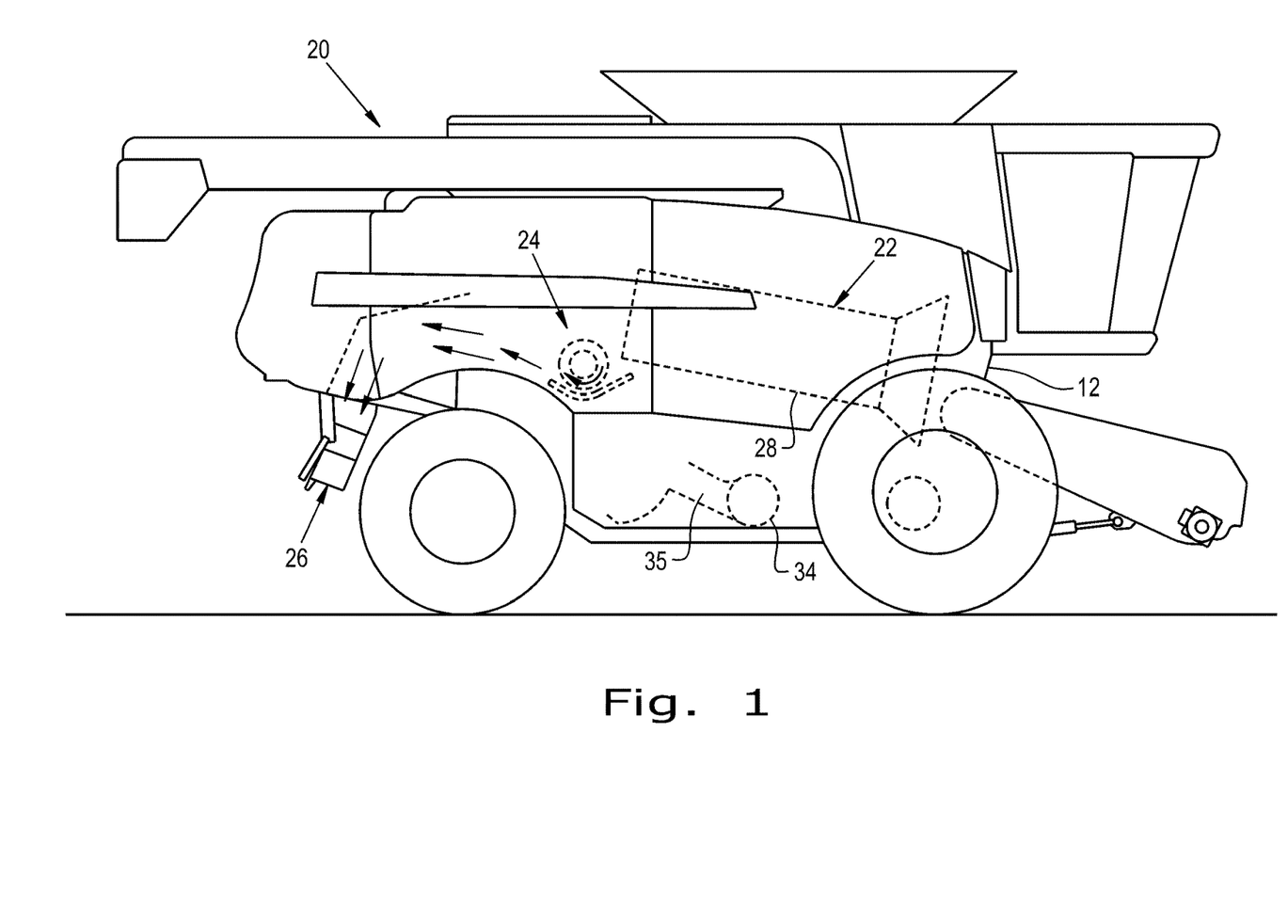
FIG. 1 is a side view of an embodiment of an agricultural harvester according to the present invention.

FIG. 1 shows an agricultural combine 20 which includes a chassis 12 carrying the usual harvesting apparatus (not all of which is shown to facilitate an understanding of the invention). An axially oriented crop processing system 22 receives harvested crop and a crop residue handling system 24 with a crop residue spreading system 26 is positioned at the aft end of combine 20. The crop processing system includes a cylindrical threshing rotor 28 that conveys a flow of crop material in a helical flow path. As the crop material is moved through the processing apparatus 22, the desired crop such as grain or other material is loosened and separated from crop residue such as husk and pods in a cleaning system located beneath the threshing rotor 28. The crop processing system 22 includes a blower 34, schematically depicted to aid in the separation of the desired crop from the crop residue. The blower 34 has a duct 35 extending aft in the combine 20 towards the cleaning system and the crop residue treatment and distribution system 24.

Figure 2:
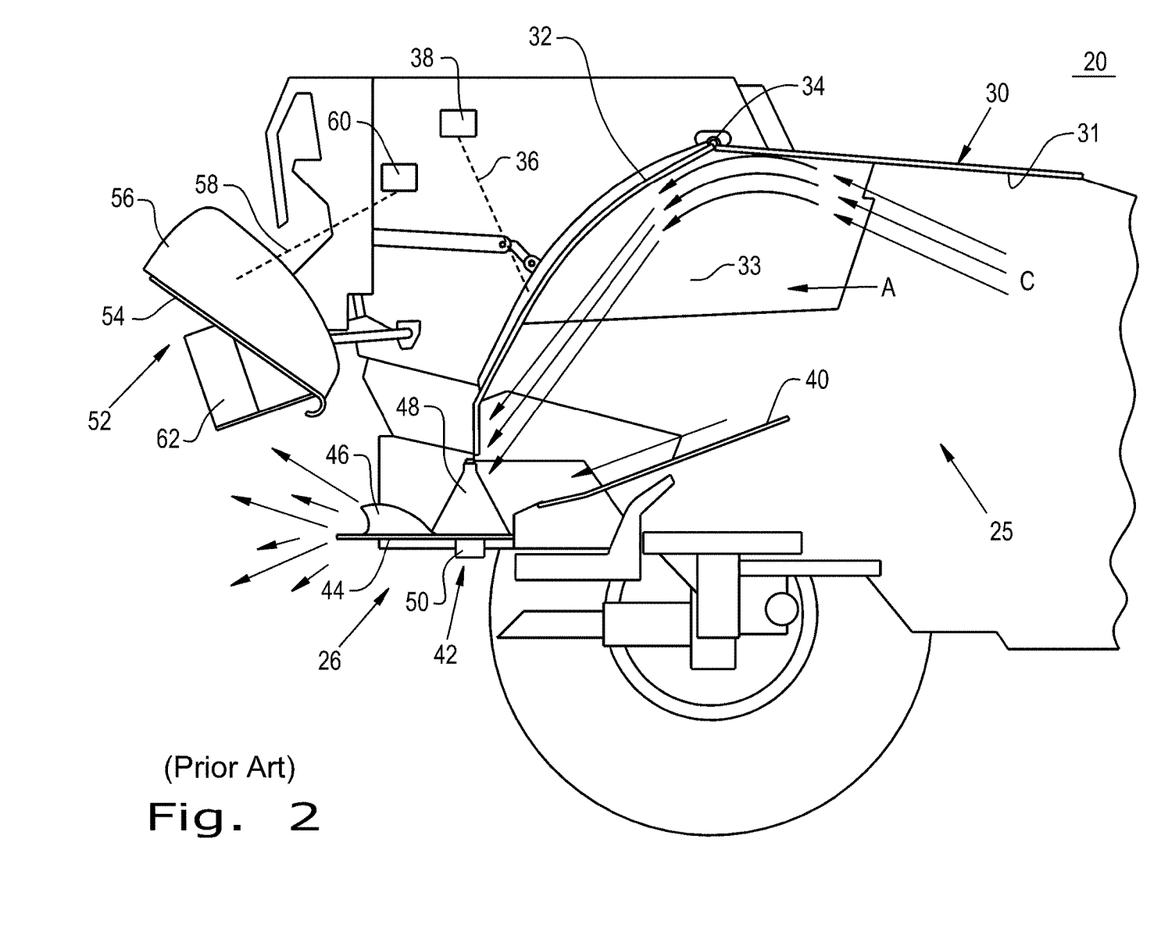
FIG. 2 is a side section view of a prior art agricultural harvester showing a straw door in a first position to laterally distribute crop residue.

Specifically referring to FIG. 2, a prior art crop residue handling system 25 is shown that includes a duct 30 including a top wall 31 and sidewalls 33 to direct crop residue in an aft direction A. A swath door 32 spans the sidewalls of the duct 30 and is pivotally mounted at 34 to the top wall 31 to be displaced between the position shown in FIG. 2 to the position shown in FIG. 3. As shown in schematic fashion, the swath door 32 is displaced by a mechanical interconnection 36 to an actuating mechanism 38, both shown in schematic fashion. A fixed floor 40 directs the crop residue stream towards a pair of spreader devices 42.

Spreader devices 42, which define material exits from the harvester 10, include side-by-side disks 44 journaled for rotation about vertical axis and positioned laterally with respect to one another. The spreader devices 42 can also be referred to as defining spreader exits from the harvester 10 to signify that material exiting the harvester 10 through the spreader devices 42 is spread on the field. Disks 44 may have a plurality of curved bats 46 that act like vanes to positively direct crop residue in a lateral direction. A cone 48 extends vertically upward from disk 44 and provides a cover for a motor 50 for each disk. The motor output shafts (not shown) cause the disks 44 to rotate as needed. Although motor 50 is illustrated as hydraulic, it may be in any one of a number of forms including mechanical interconnection to a remotely positioned motor. Rotation of disks 44 is set up so that when viewed from above and looking towards the front of the combine 20, the right side disk rotates counterclockwise and the left disk rotates clockwise so that they propel crop residue between them aft and around and laterally.

In the position illustrated in FIG. 2, both the straw and chaff are directed aft in direction A and are deflected downward by swath door 32 to impact on the disks 44 and curved bats 46. The rotation of the disks 44 causes the material to be distributed aft and laterally of the combine 20.

A windrow chute generally indicated at 52 is provided. The windrow chute 52 can define a windrow exit from the harvester 10, but it should be appreciated that the windrow exit from the harvester 10 does not need to be a windrow chute 52 and can be an opening in the harvester 10 that allows material to exit out the back of the harvester 10 in windrows. Windrow chute 52 includes a bottom portion 54 and adjacent sidewalls 56. Windrow chute 52 is displaceable between the position illustrated in FIG. 2 in which it is out of the crop residue stream and the position illustrated in FIG. 3. Windrow chute 52 is displaced by a mechanical connection 58 leading to an actuator 60. Windrow chute 52 additionally includes one more deflectors 62 fixed to and projecting downwardly from bottom portion 54.

In the positions shown in FIG. 2, the windrow chute 52 is in its first position in which it is positioned out of the crop residue stream and the swath door 32 is in its first lowered position in which it directs all of the crop residue stream towards the spreading devices 26.

Figure 3:
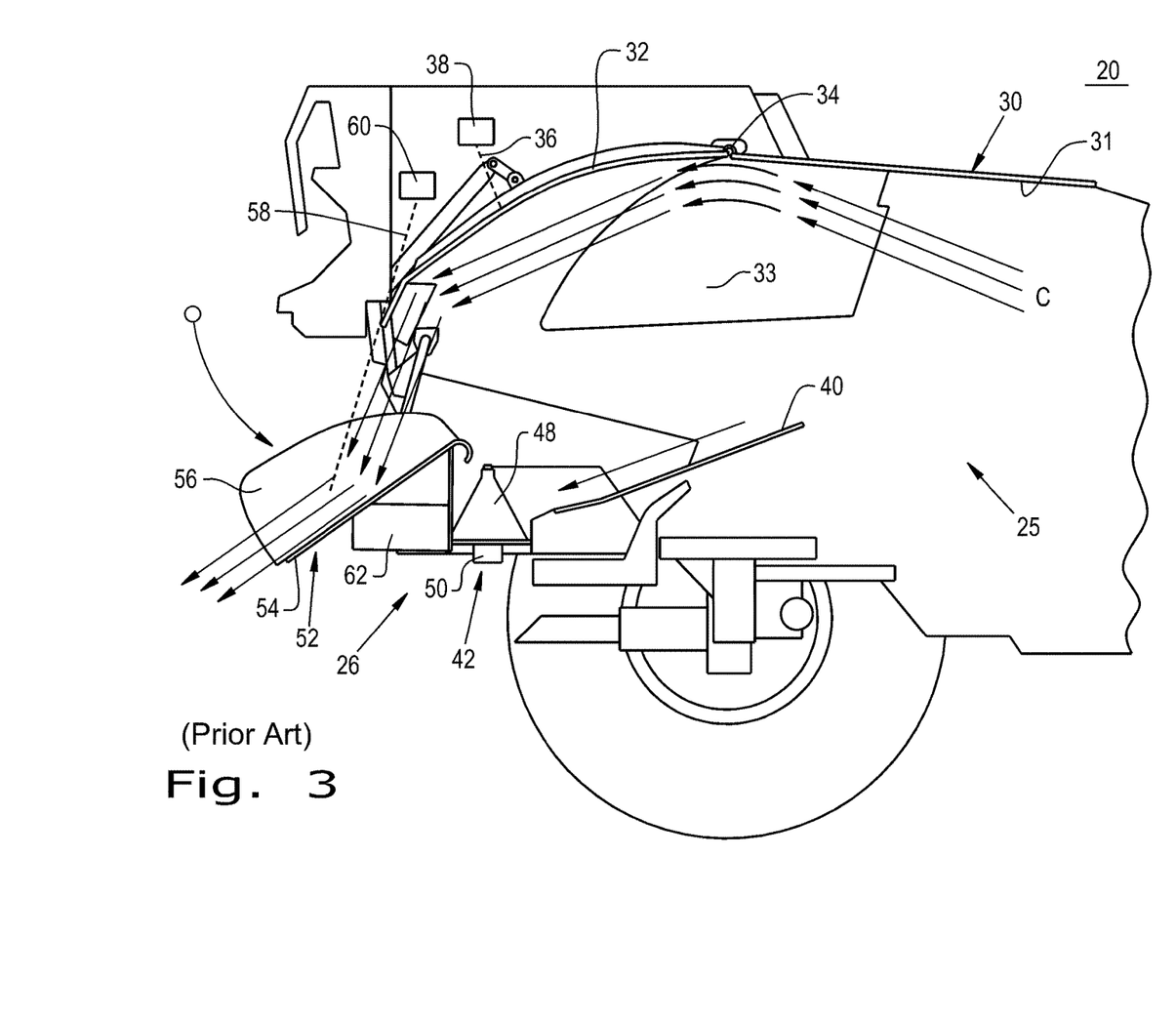
FIG. 3 is a side section view of the harvester shown in FIG. 2 with the crop door in a second position for windrowing straw and laterally distributing chaff.

As shown in FIG. 3, the straw door 32 may be pivoted by the actuator 38 to the illustrated second position in which it is elevated and does not direct all of the crop residue stream towards the spreading devices 42. At the same time, the actuator 60 displaces the windrow chute 52 to the illustrated second position in which it is in the crop residue stream. In the crop residue stream, the straw tends to be elevated and as such is directed downward to the windrow chute 52 and the impact slows the velocity of the straw. In addition, the convergence of the windrow chute enables a better formed windrow of straw which is directed downstream of the combine 20. At the same time, the chaff in the crop residue stream falls to the residue spreader system 26 and the deflector(s) 62 keep the air flow from the disks 44 out of the windrow for the straw so that it does not disturb the proper positioning in the field. The chaff in this condition is spread laterally.

The actuators 38 and 60 are coordinated to place the swath door and windrow chute 52 in their respective positions in coordinated interdependent fashion. The actuators may be implemented in a way that it is done by control from an operator of the harvester. This feature allows minimal time to change the configuration of the harvester from a spreading operation to an operation in which straw is windrowed and chaff is spread laterally across the field. This enables significant increases in operator efficiency and harvesting effectiveness.

As can be seen in comparing FIG. 2 to FIG. 3, the trajectory of the crop residue flow, represented by arrows C, to the spreaders 42 is abruptly blocked by the straw door 32 when the straw door 32 is in the first position shown in FIG. 2. This abrupt blocking is caused by the residue flow C being at a relatively high velocity when the residue flow C contacts the straw door 32 in the first position so that the residue flow C is directed toward the spreaders 42, rather than following a more gentle path along the straw door 32 when the straw door 32 is in the second position, as shown in FIG. 3. This abrupt blocking of the residue flow C can cause the residue to be impacted to the straw door 32, leading to blockage, and also cause an uneven flow of residue to the spreaders 42.

Figure 4:
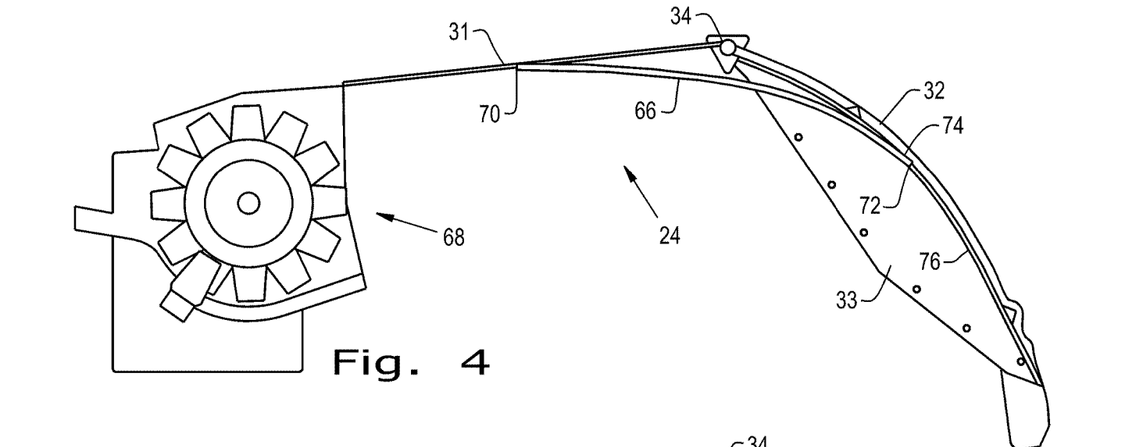
FIG. 4 is a side section view of an embodiment of a residue handling system according to the present invention with a straw door in a first position to laterally distribute crop residue.

Referring now to FIG. 4, a portion of the crop residue handling system 24 according to the present invention is shown. All elements of the crop residue handling system 24 shown in FIGS. 4-5 that are similar to those of the prior art crop residue handling system 25 shown in FIGS. 2-3 are assigned similar reference numerals for ease of description and illustration. As can be seen, the crop residue handling system 24 has a flexible guide 66 associated with the straw door 32 that is placed in the flow of crop material from a chopper assembly 68. As used herein, the flexible guide 66 is "associated with" the straw door 32 in the sense that movement of the straw door 32 causes movement and/or deformation of the flexible guide 66, which can result from a static or dynamic connection between the flexible guide 66 and straw door 32. The flexible guide 66 is formed of a flexible material and associated with the straw door 32, through fixation or otherwise, so that the flexible guide 66 has a shape that will deform when the straw door 32 switches between a first position, shown in FIG. 4, and a second position, shown in FIG. 5. The flexible guide 66 can be, for example, formed as a sheet of flexible material that is solid and attached to the top wall 31. The straw door 32 can also be pivotally connected to the top wall 31, so that as the straw door 32 pivots between its first position and second position the flexible guide 66 is forced to deform in response to the changing angle of the straw door 32 relative to the top wall 31 to which the flexible guide 66 is attached.

Figure 5:
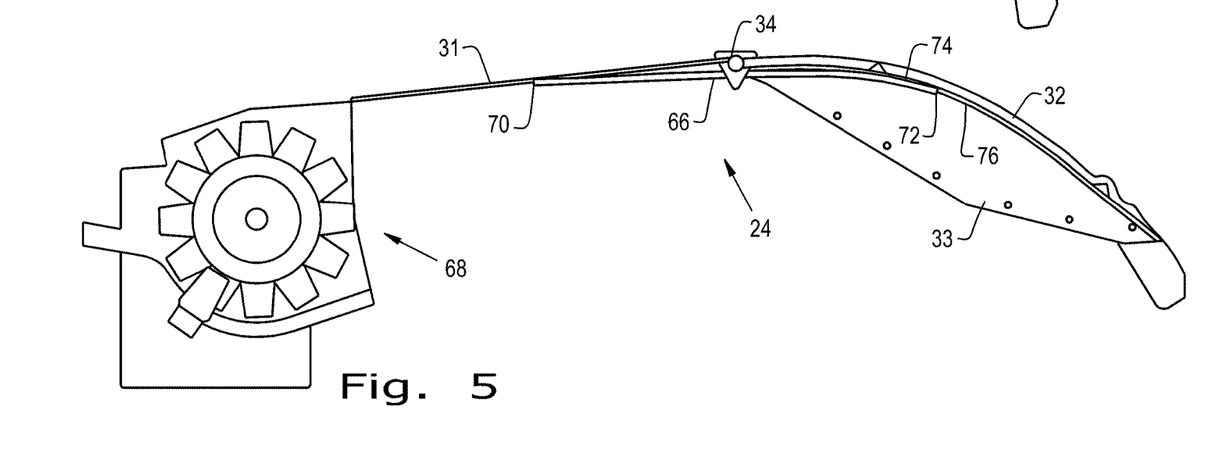
FIG. 5 is a side section view of the residue handling system shown in FIG. 4 with the straw door in a second position for windrowing straw.

When the straw door 32 is in its first position, shown in FIG. 4, and directed toward the spreader(s) 42, the angle formed between top sheet 31 and the straw door 32 is steeper relative to when the straw door 32 is in the second position, shown in FIG. 5, and directed toward the windrow chute 52. The flexible guide 66, which is shown as a sheet of flexible material fixed to the top wall 31 and associated with the straw door 32 in FIGS. 4-5, can deform so that a first end 70 of the flexible sheet 66 attached to the top wall 31 can define a tangent relative to the top wall 31 and a second end 72 of the flexible sheet 66 associated with the straw door 32 can define a tangent relative to the straw door 32, with the material of the flexible sheet 66 between the two ends 70 and 72 of the flexible sheet 66 curvably deforming in response. This deformation of the flexible sheet 66 provides a smoother path for crop material from the chopper assembly 68 to follow, maintaining a laminar stream of crop material flow toward the spreaders 42 and reducing the chance of crop material creating a blockage. When the straw door 32 is in the second position, as shown in FIG. 5, the first end 70 of the flexible sheet 66 can lay flat against the top wall 31 and the second end 72 of the flexible sheet 66 can lay flat against the straw door 32 so the flexible sheet 66 does not provide much, if any, disruption of the crop material flow.

Figure 6:
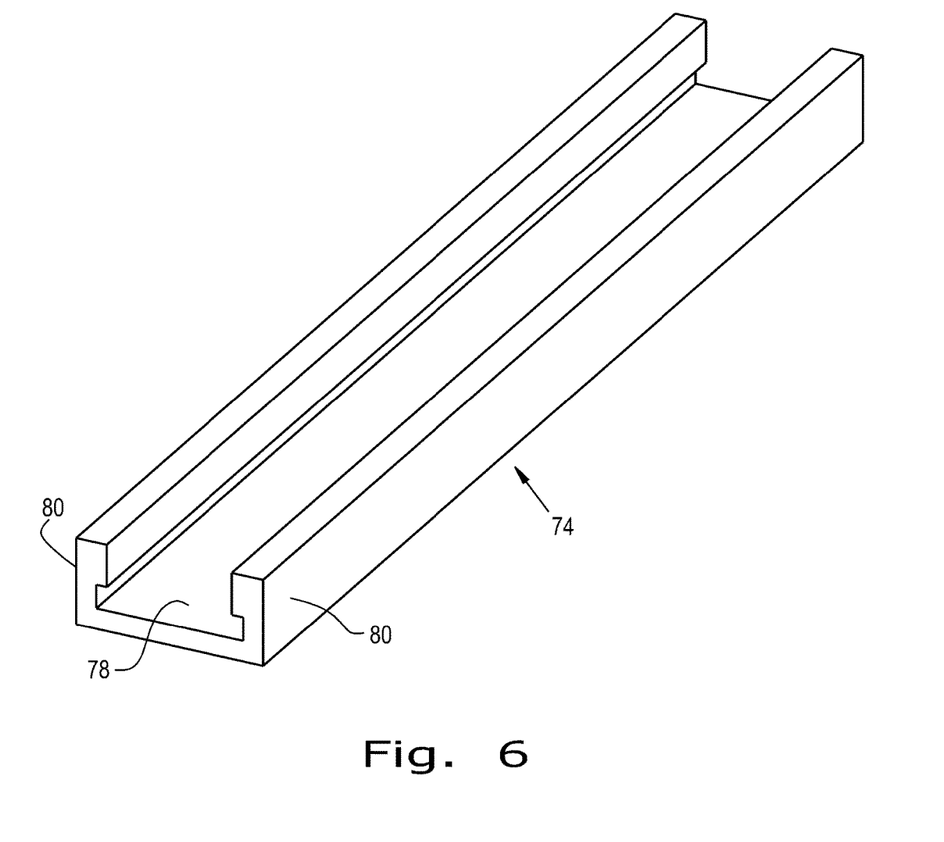
FIG. 6 is a perspective view of an embodiment of a track that can be included on the straw door.

As can be seen between FIGS. 4 and 5, the second end 72 of the flexible sheet 66 can change its relative position on the straw door 32 in response to the straw door 32 switching between its first position and second position. To allow this movement, and referring now to FIG. 6, a track 74 can be included on the straw door 32 that holds part of the flexible guide 66. The track 74 can be, for example, a T-track formed in an interior surface 76 of the straw door 32 and having a channel 78 between two flanged sidewalls 80 that the flexible guide 66 can be held within. If desired, the track 74 can also be an independent piece from the straw door 32 that is mounted to the interior surface 76 of the straw door 32. As the straw door 32 moves, the flexible guide 66 can slide within the channel 78 and be held tangent to the straw door 32 by the T-track 74. The sliding movement of the flexible guide 66 within the track 74 can maintain the tangential relationship of the flexible guide 66 to the straw door 32 without a rigid connection that might cause excessive flexing of the flexible guide 66, which could lead to snapping of the flexible guide 66 and also cause an abrupt blockage of crop material flow. It is also contemplated that the track 74 can be formed in or mounted to the top wall 31, with the flexible guide 66 rigidly connected to the straw door 32.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural vehicle, comprising:
a chassis;
a crop processing mechanism carried by said chassis and configured to separate crop material and discharge crop residue therefrom; and
a residue handling system that receives separated crop material and discharged crop residue from said crop processing mechanism, said residue handling system including:
at least one spreader device defining a spreader exit;
a windrow chute defining a windrow exit;
a straw door selectively positionable between a first position and a second position, said straw door directed toward said spreader exit in said first position and directed toward said windrow exit in said second position; and
a flexible guide associated with said straw door and having a shape that deforms when said straw door switches between said first position and said second position, wherein in said first position said flexible guide is placed in a flow of crop material such that said shape of said flexible guide creates a smooth trajectory path of crop material flow toward said spreader exit.

2. The agricultural vehicle according to claim 1, wherein said flexible guide is a sheet of flexible material.

3. The agricultural vehicle according to claim 1, wherein said residue handling system includes a wall and said straw door is pivotally connected to said wall.

4. The agricultural vehicle according to claim 3, wherein said flexible guide is connected to said wall.

5. The agricultural vehicle according to claim 4, wherein said straw door includes a track and said flexible guide is at least partially held in said track, said flexible guide being configured to move along said track when said straw door switches between said first position and said second position.

6. The agricultural vehicle according to claim 5, wherein said track is a T-track.

7. The agricultural vehicle according to claim 4, wherein said flexible guide has a first end contacting said wall and a second end contacting said straw door, said flexible guide being configured such that said first end defines a tangent to said wall and said second end defines a tangent to said straw door when said straw door is in said first position.

8. The agricultural vehicle according to claim 7, wherein said first end of said flexible guide lays substantially flat against said wall when said straw door is in said second position and said second end of said flexible guide lays substantially flat against said straw door when said straw door is in said second position.

9. The agricultural vehicle according to claim 4, wherein said wall is a top wall of said residue handling system.

10. The agricultural vehicle according to claim 1, wherein said straw door prevents crop material from being discharged into said windrow exit when said straw door is in said first position.

11. A residue handling system for an agricultural harvester, comprising:
at least one spreader device defining a spreader exit;
a windrow exit;
a straw door selectively positionable between a first position and a second position, said straw door directed toward said spreader exit in said first position and directed toward said windrow exit in said second position; and
a flexible guide associated with said straw door and having a shape that deforms when said straw door switches between said first position and said second position, wherein in said first position said flexible guide is placed in a flow of crop material such that said shape of said flexible guide creates a smooth trajectory path of crop material flow toward said spreader exit.

12. The residue handling system according to claim 11, wherein said flexible guide is a sheet of flexible material.

13. The residue handling system according to claim 11, further comprising a top wall, said straw door being pivotally connected to said top wall.

14. The residue handling system according to claim 13, wherein said flexible guide is connected to said top wall.

15. The residue handling system according to claim 14, wherein said flexible guide has a first end contacting said top wall and a second end contacting said straw door, said flexible guide being configured such that said first end defines a tangent to said top wall and said second end defines a tangent to said straw door when said straw door is in said first position.

16. The residue handling system according to claim 15, wherein said first end of said flexible guide lays substantially flat against said top wall when said straw door is in said second position and said second end of said flexible guide lays substantially flat against said straw door when said straw door is in said second position.

17. The residue handling system according to claim 11, further comprising a chopper assembly configured to discharge crop material toward said straw door.

18. The residue handling system according to claim 17, wherein said straw door prevents crop material from being discharged into said windrow exit when said straw door is in said first position.

19. A residue handling system for an agricultural harvester, comprising:
 a top wall;
 at least one spreader device defining a spreader exit;
 a windrow exit;
 a straw door pivotally connected to said top wall and selectively positionable between a first position and a second position, said straw door directed toward said spreader exit in said first position and directed toward said windrow exit in said second position; and
 a flexible guide connected to said top wall and associated with said straw door and having a shape that deforms when said straw door switches between said first position and said second position, wherein said straw door includes a track and said flexible guide is at least partially held in said track, said flexible guide being configured to move along said track when said straw door switches between said first position and said second position.

20. The residue handling system according to claim 19, wherein said track is a T-track.

* * * * *